United States Patent [19]

Shen

[11] Patent Number: 5,440,907
[45] Date of Patent: Aug. 15, 1995

[54] STEERING WHEEL LOCK ASSEMBLY WITH A REMOVABLE CYLINDER

[76] Inventor: Chao C. Shen, No. 62, Hoshan St., Tainan, Taiwan

[21] Appl. No.: 273,959

[22] Filed: Jul. 12, 1994

[51] Int. Cl.⁶ ............................................. B60R 25/02
[52] U.S. Cl. ........................................ 70/209; 70/226; 70/370
[58] Field of Search ................... 70/209–212, 70/225, 226, 237, 238, 370, 371

[56] References Cited

U.S. PATENT DOCUMENTS

| | | | |
|---|---|---|---|
| 4,381,656 | 5/1983 | Hayakawa | 70/370 |
| 4,586,354 | 5/1986 | Smith | 70/370 |
| 5,040,388 | 8/1991 | Chen | 70/216 |
| 5,121,617 | 6/1992 | Chen | 70/209 |
| 5,131,245 | 7/1992 | Chen | 70/226 |
| 5,211,041 | 5/1993 | Hsu | 70/209 |
| 5,253,497 | 10/1993 | Hsieh | 70/226 |
| 5,284,037 | 2/1994 | Chen et al. | 70/226 |
| 5,291,767 | 3/1994 | Weindorf, Jr. et al. | 70/371 |

Primary Examiner—Peter M. Cuomo
Assistant Examiner—Monica E. Millner
Attorney, Agent, or Firm—Merchant, Gould, Smith, Edell, Welter & Schmidt

[57] ABSTRACT

A vehicle steering wheel lock assembly includes a body having a base extending therefrom, a first hook member securely attached to a first side of the body, and a second hook member partially received in a second side of the body. A cylinder is removably received in the base. A lock piece is slidably received in the body and actuatable by the cylinder. The second hook member is releasably engageable with the lock piece and is movable in two directions of away from and toward the first hook member when the cylinder is in an unlocked position and is movable in only one of the two directions when the cylinder is in a locked position.

4 Claims, 4 Drawing Sheets

STEERING WHEEL LOCK ASSEMBLY WITH A REMOVABLE CYLINDER

BACKGROUND OF THE INVENTION

1. Field of the Invention

The present invention relates to a steering wheel lock assembly with a removable cylinder.

2. Description of Related Art

Vehicles have become one of the most important tools for transportation. In addition to the equipped lock, the vehicle owner generally additionally uses a steering wheel lock, gear shift stick lock, etc., to prevent the vehicle from being stolen. However, the cylinders of conventional steering wheel locks are not removable, such that the user has to change the whole Steering wheel lock if the key is lost or the user suspects that the key has been duplicated without authorization. Moreover, the user has to carry a further key which can only be used to unlock the vehicle steering wheel lock. This is inconvenient for modern people who wish to carry as few keys as possible.

Therefore, there has been a long and unfulfilled need for a steering wheel lock assembly with a removable cylinder to obviate the above-mentioned problems.

SUMMARY OF THE INVENTION

A vehicle steering wheel lock provided by the invention includes a body having a base extending therefrom, a first hook member securely attached to a first end of the body, and a second hook member partially received in a second end of the body. A cylinder is received in the base and includes a plug with an end. A lock piece is slidably received in the body and actuatable by the plug.

A cap is mounted to and thus seals the base. The cap has a central hole in which the end of the plug is rotatably received and a pair of first screw holes are defined therein. The cap further has a pair of substantially L-shaped members projecting therefrom, each L-shaped member having a second screw hole therein which aligns with an associated first screw hole. A fastener engages with each second screw hole for removably mounting the cap to the base.

A protective cover is securely mounted around the end of the plug of the cylinder to rotate therewith and has a pair of third holes therein. The first, second, and third screw holes align with each other when the cylinder is in an unlocked position such that the second screw holes are accessible to detach the cap from the base when change of the cylinder is required, and the second screw holes are shielded by the protective cover when the cylinder is in a locked position.

The second hook member is releasably engageable with the lock piece and is movable in two directions of away from and toward the first hook member when the cylinder is in an unlocked position and is movable in only one of the two directions when the cylinder is in a locked position.

Other objects, advantages, and novel features of the invention will become more apparent from the following detailed description when taken in conjunction with the accompanying drawings.

DESCRIPTION OF THE PREFERRED EMBODIMENT

Figure 1:
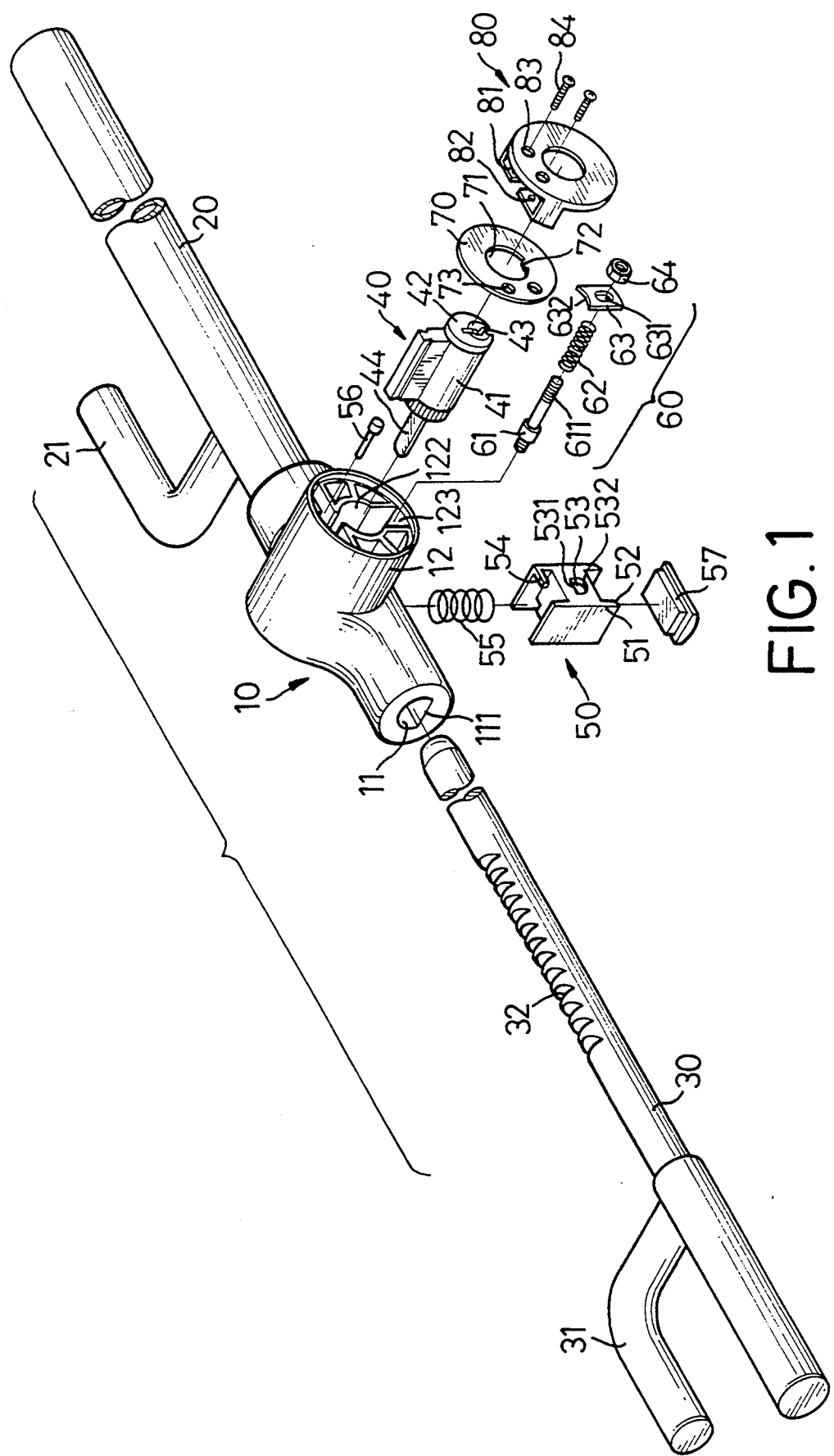
FIG. 1 is an exploded view of a steering wheel lock in accordance with the present invention.
Figure 4:
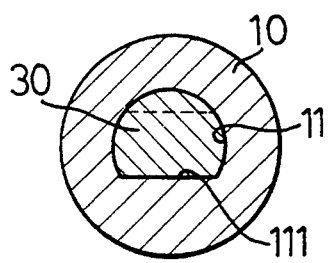
FIG. 4 is a cross-sectional view taken along line 4—4 in FIG. 2.

Referring to the drawings and initially to FIG. 1, a steering wheel lock assembly in accordance with the present invention includes a body 10, a first hook member 20 securely attached to a first end of the body 10, and a second hook member 30 slidably received in a longitudinal bore 11 defined in the body 10. The bore 11 has a flat-bottom surface 111, and the second hook member 30 has a sectional configuration corresponding to that of the bore 11 (see FIG. 4), such that the second hook member 30 may slide therealong yet rotational movement of the second hook member 30 is prohibited. The first and second hook members 20 and 30 each have a hook member 21, 31 thereon which extend away from the body 10, and the second member 30 has a plurality of teeth 32, whose purpose and function will be described in detail later.

Figure 2:
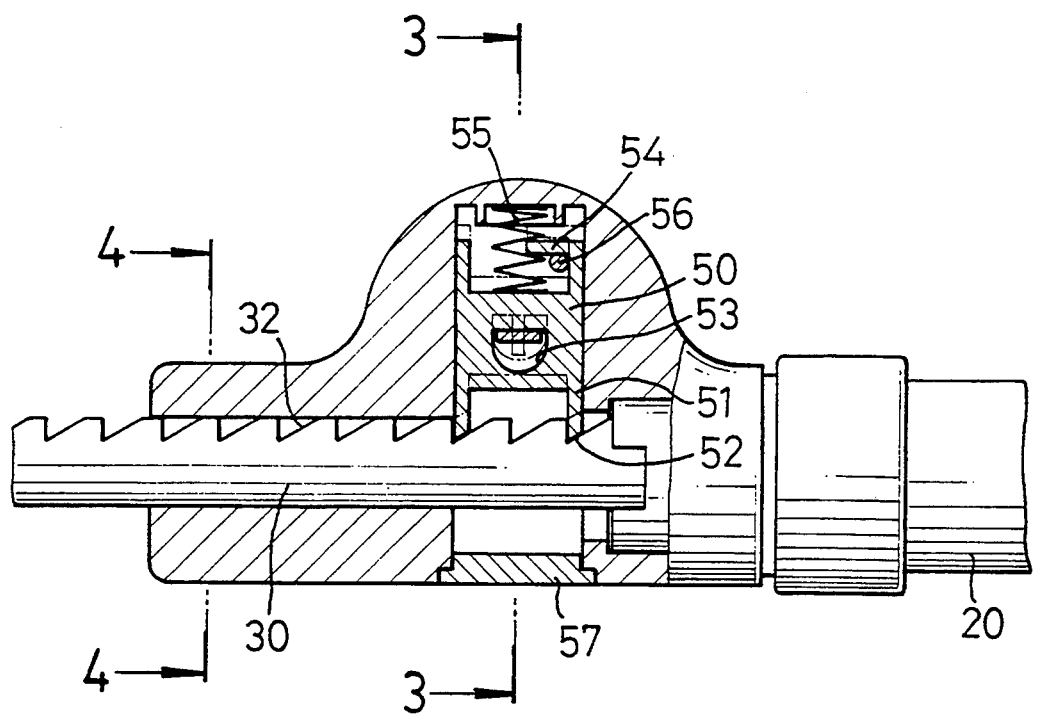
FIG. 2 is a partial front elevational view, partly in section, of the steering wheel lock.
Figure 3:
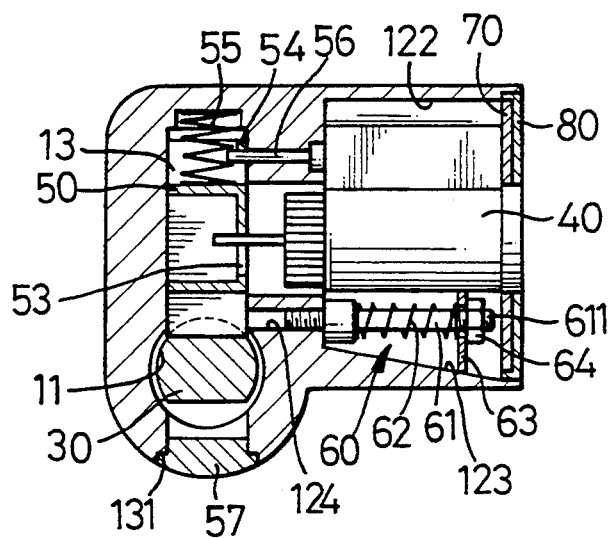
FIG. 3 is a cross-sectional view taken along line 3—3 in FIG. 2.

Still referring to FIG. 1, and further to FIGS. 2 and 3, the body 10 further has a base 12 projecting from a mediate section thereof and extending in a direction transverse to the longitudinal axis thereof. The base 12 defines therein a compartment 122 which communicates with the longitudinal bore 11. A vertical recess 13 is defined in the body 10 and the base 12 and communicates with the bore 11 and the compartment 122.

A cylinder 40 is removably received in the compartment 122 and includes a plug 42 housed in a housing 41. A tailpiece 44 is attached to a rear end of the plug 42 to rotate therewith, and a keyway 43 is defined in a front end of the plug 42.

Referring to FIGS. 1 and 3, preferably, the base 12 has an inclined bottom surface 123, and further comprises an adjusting assembly 60 for securely retaining the cylinder 40 in position. As can be seen in FIGS. 1 and 3, the adjusting assembly 60 includes a bolt 61 whose first end is positioned in a screw hole 124 defined in the base 12. A spring 62 is mounted around the bolt 61. A retaining piece 63 with a hole 631 and an adjusting nut 64 are mounted around a second threaded end 611 of the bolt 61 with a lower end of the retaining piece 63 contacting with the inclined bottom surface 123 and with an upper end 632 of the retaining piece 63 contacting with a peripheral edge of the cylinder 40, such that the cylinder 40 is tightly retained in position upon rotation of the adjusting nut 64.

A cap 80 is mounted to and thus seals the base 12. The cap 80 has a central hole (not labeled) in which the front end of the plug 42 is rotatably received and a pair of first screw holes 83 are defined therein. The cap 80 further has a pair of substantially L-shaped members 81 projecting therefrom, each L-shaped member 81 having a second screw hole 82 therein which aligns with the associated first screw hole 83. A fastener, such as a screw 84, engages with each second screw hole 82 for removably mounting the cap 80 to the base 12.

A protective cover 70 includes a central hole 71 and a protrusion 72 projecting inward from a periphery of the central hole 71. The protective cover 70 is securely mounted around the front end of the plug 42 of the cylinder 40 to rotate therewith by means Of the protrusion 72 engaging with a notch (not labeled) defined in the front end of the plug 42. The protective cover 70 further has a pair of third holes 73 therein which are arranged in a manner that the first, second, and third screw holes 83, 82, and 73 align with each other when the cylinder 40 is in an unlocked position (see FIGS. 5 and 6) such that the second screw holes 82 are accessible to detach the cap 80 from the base 12 when change of the cylinder 40 is required, and that the second screw holes 82 are shielded by the protective cover 70 when the cylinder 40 is in a locked position (see FIGS. 7 and 8).

Referring to FIGS. 1 through 3, a spring 55 and a lock piece 50 are received in the vertical recess 13. The lock piece 50 includes two spaced legs 51 at a lower end thereof, each leg 51 having a beveled surface 52 for engaging with the teeth 32 of the second hook member 30 (see FIG. 2). Furthermore, the lock piece 50 includes a hole 53 therein which engages with and thus is operable by the tailpiece 44 of the cylinder 40. The hole 53 is defined by a flat upper side 531 and a partially circular surface 532 in the remaining part.

Preferably, the lock piece 50 includes a stop piece 54 at an upper end thereof, and the base 12 includes therein a stop member, such as a pin 56 (see FIG. 3) which locates below the stop piece 54 thereby preventing excessive downward movement of the stop piece 54.

In mounting, the spring 55 is firstly inserted via an open lower end 131 of the Vertical recess 13. The lock piece 50 is subsequently inserted into the recess 13, and the pin 56 is then positioned below the stop piece 54 of the lock piece 50 to restrict the travel distance of the lock piece 50. Thereafter, a lid 57 is inserted in the lower end 131 of the recess 13 to seal the latter.

Figure 7:
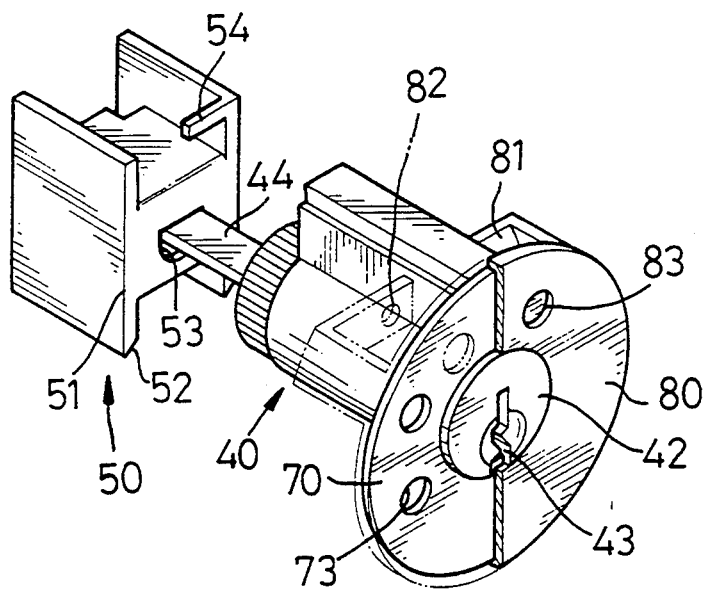
FIG. 7 is a perspective view of the cylinder and the lock piece in a locked position.
Figure 8:
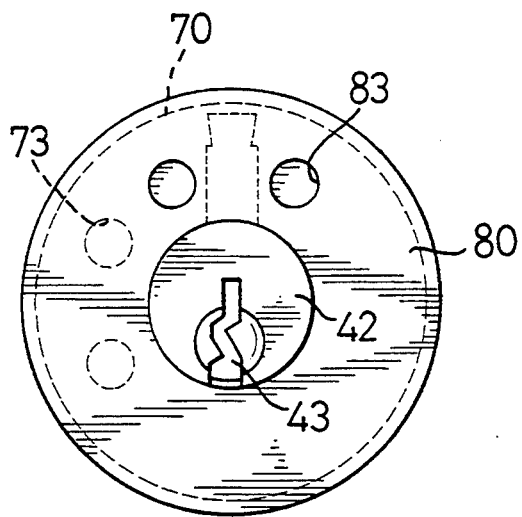
FIG. 8 is a front view of the cylinder in a locked position.

In operation, when the cylinder is in a locked position shown in FIGS. 7 and 8 and the solid lines in FIG. 2, the protective cover 70 shields the second screw holes 82 such that unauthorized slackening of the screws 84 is not permitted. As shown in FIG. 2, in this position, the beveled surfaces 52 of the legs 51 of the lock piece 50 engage with teeth 32 of the second hook member 30 such that the second hook member 30 is only movable away from the first hook member 20.

Figure 5:
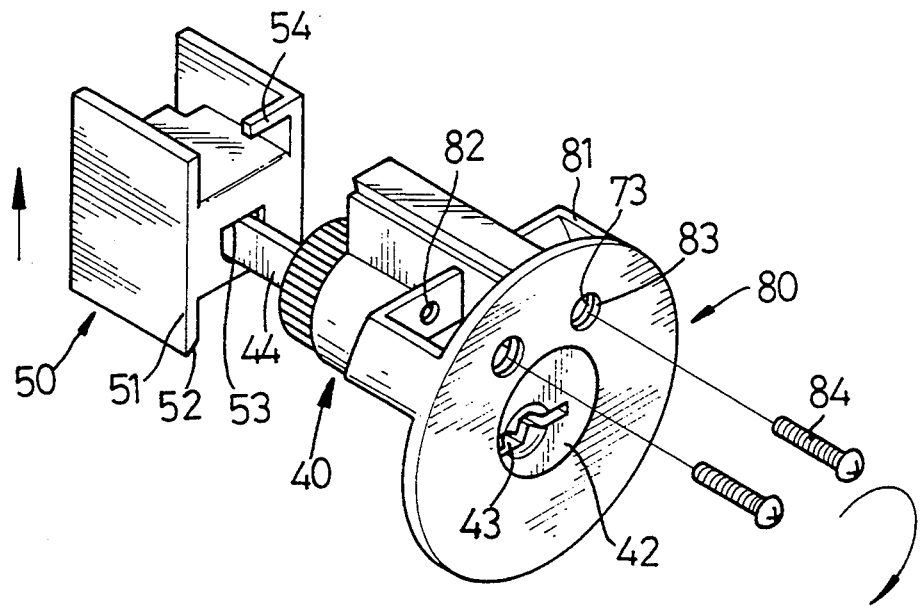
FIG. 5 is a perspective view of the cylinder and the lock piece in an unlocked position.
Figure 6:
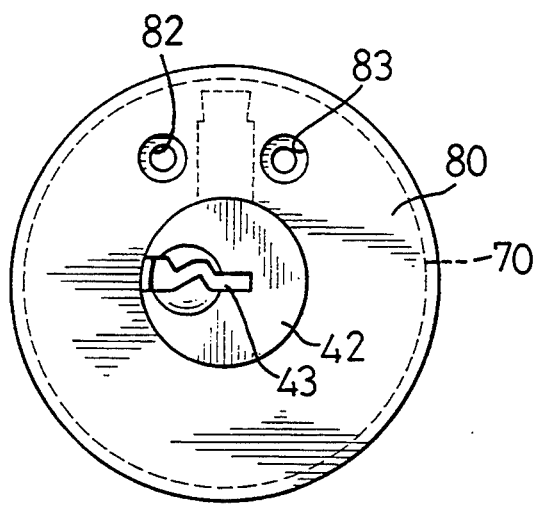
FIG. 6 is a front view of the cylinder in an unlocked position.

When a correct key is inserted into the keyway 43 and is rotated clockwise through 90°, the plug 42 as well as the tailpiece 44 also rotate through 90° to an unlocked position shown in FIGS. 5 and 6 and the phantom lines in FIG. 2. In this position, the beveled surfaces 52 of the legs 51 of the lock piece 50 disengage with teeth 32 of the second hook member 30 such that the second hook member 30 is movable either away from or toward the first hook member 20.

In use, the lock assembly is mounted to a vehicle steering wheel, and with the cylinder 40 in the locked position, the user may pull the second hook member 30 away from the first hook member 20 which is firstly hooked to a peripheral ring of the steering wheel to securely lock the steering wheel. When unlocking, the key is inserted into the keyway 43 and rotated through 90° and the second hook member 30 is then moved toward the first hook member 20 until the whole lock assembly can be removed from the steering wheel. Such operation is conventional and therefore is not further described.

Although the hook members 20 and 30 in this embodiment are both mounted to the steering wheel, it is appreciated that the hooks 21 and 31 thereon may be arranged to locate at distal ends thereof and face with each other such that one hook may be hooked on the steering wheel while the other hook is hooked on the pedal.

Although the invention has been explained in relation to its preferred embodiment, it is to be understood that many other possible modifications and variations can be made without departing from the spirit and scope of the invention as hereinafter claimed.

I claim:

1. A vehicle steering wheel lock assembly comprising:

a body having first and second ends and a longitudinal axis, a longitudinal bore being defined in said body, said body further having a base projecting therefrom and extending in a direction transverse to said longitudinal axis, said base defining a compartment which communicates with said longitudinal bore, said compartment having an inclined bottom surface, a recess being defined in said body and communicating with said bore and said compartment;

a cylinder removably received in said compartment and having a plug with an end and a tailpiece operable by said plug;

a bolt having a first end mounted in said compartment and a threaded second end, a retaining piece and an adjusting nut being mounted around said threaded second end of said bolt with a lower end of said retaining piece contacting with said inclined bottom surface of said compartment and with an upper end of said retaining piece contacting with a peripheral edge of said cylinder such that said cylinder is tightly retained in position upon rotation of said adjusting nut;

a cap mounted to and thus sealing said base, said cap having a central hole in which said end of said plug is rotatably received and a pair of first screw holes therein, said cap further having a pair of substantially L-shaped members projecting therefrom, each said L-shaped member having a second screw hole therein which aligns with an associated said first screw hole, a fastener engaging with each said second screw hole for removably mounting said cap to said base;

a protective cover disposed between said cap and said base and securely mounted around said end of said plug of said cylinder to rotate therewith and having a pair of third screw holes therein, said first, second, and third screw holes align with each other when said cylinder is in an unlocked position such that said second screw holes arc accessible to detach said cap from said base, and said second screw holes are shielded by said protective cover when said cylinder is in a locked position;

a spring-biased lock piece slidably received in said recess, said spring-biased lock piece engaging with and thus actuatable by said tailpiece of said cylinder and thus slidable in said recess upon rotation of said cylinder, said lock piece having an engaging surface;

a first hook member securely mounted to said first end of said body; and a second hook member partially received in said bore of said body and having a plurality of teeth therein for releasably engaging with said engaging surface of said lock piece, said second hook member being movable in two directions of away from and toward said first hook member when said cylinder is in an unlocked position in which said engaging surface of said lock piece disengages with said teeth of said second hook member, and said second hook member being movable in only one of said two directions when said cylinder is in a locked position in which said engaging surface of said lock piece engages with said teeth of said second hook member.

2. The vehicle steering wheel lock assembly as claimed in claim 1 wherein said spring-biased lock piece includes two spaced legs at a lower end thereof, said engaging surface includes a beveled surface at an end of each said leg for engaging with said teeth of said second hook member.

3. The vehicle steering wheel lock assembly as claimed in claim 2 wherein said lock piece includes a stop piece at an upper end thereof, and said body includes a stop member disposed in said recess below said stop piece thereby preventing excessive downward movement of said stop piece.

4. The vehicle steering wheel lock assembly as claimed in claim 3 wherein said bore of said body includes a flat bottom surface and said second hook member has a cross-sectional configuration the same as that of said bore thereby preventing rotational movement of said second hook member.

* * * * *